United States Patent [19]

Schulz et al.

[11] Patent Number: 5,837,030

[45] Date of Patent: Nov. 17, 1998

[54] PREPARATION OF NANOCRYSTALLINE ALLOYS BY MECHANICAL ALLOYING CARRIED OUT AT ELEVATED TEMPERATURES

[75] Inventors: Robert Schulz, Ste-Julie; Reynald Rioux, Boucherville; Sabin Boily, Chambly; Jacques Huot, Ste-Julie, all of Canada

[73] Assignee: Hydro-Quebec, Montreal, Canada

[21] Appl. No.: 752,893

[22] Filed: Nov. 20, 1996

[51] Int. Cl.⁶ .................................................. B22F 9/04
[52] U.S. Cl. .............................. 75/352; 75/357; 241/223; 420/900
[58] Field of Search ............................ 75/352, 357, 363; 241/17, 23; 420/900

[56] References Cited

U.S. PATENT DOCUMENTS 4,613,362  9/1986  Welter et al. ........................... 420/900

FOREIGN PATENT DOCUMENTS

| 0 550 958 | 7/1993 | European Pat. Off. . |
| 0 671 357 | 9/1995 | European Pat. Off. . |
| 1-215903 | 8/1989 | Japan . |
| 96/23906 | 8/1996 | WIPO . |

OTHER PUBLICATIONS

L. Zaluski et al., Effects of Relaxation on Hydrogen Absorption in Fe–Ti Produced by Ball–Milling, Journal of Alloys and Compounds, vol. 227, 1995, pp. 53–57.

L. Zaluski et al., Hydrogen Absorption in Nanocrystalline Mg₂Ni Formed by Mechanical Alloying, Journal of Alloys and Compounds, vol. 217, 1995, pp. 245–249.

M. Y. Song et al., Hydriding Properties of a Mechanically Alloyed Mixture with a Composition $Mg_2Ni$, International Journal of Hydrogen Energy, vol. 10, No. 3, 1985, pp. 169–178.

J. Li et al., "A New Method for the Production of Mg–Ni Hydrogen Storage Materials", Advanced Materials, vol. 5, No. 7/8, Jul./Aug. 1993, pp. 554–555.

B. L. Huang et al., "Formation of Supersaturated Solid Solutions by Mechanical Alloying" NanoStructured Materials, vol. 7, Nos. 1/2, pp. 67–79, 1956.

Y. Chen et al., "Influence of milling temperature and atmosphere on the synthesis of iron nitrides by bail milling", Materials Science and Engineering A 206 (1996) 24–29.

J. Eckert et al., "Glass–forming range in mechanically alloyed Ni–Z and the influence of the milling intensity", J. Appl. Phys. 64(6), 15 Sep. 1966.

R. M. Davis et al., "Mechanical Alloying of Brittle Materials", Metallurgical Transactions, vol. 19A, Dec. 1988.

*Primary Examiner*—George Wyszomierski
*Attorney, Agent, or Firm*—Foley & Lardner

[57] ABSTRACT

A process is described for preparing a nanocrystalline powder of an alloy of at least two metals by an intensive mechanical grinding step performed upon powders of the metals which make up the alloy. The grinding is performed at atmospheric pressure under an inert atmosphere, and is carried out at a temperature in the range of 100°–400° C. In this manner, one obtains crystallites of the alloy having a grain size lower than 100 nm by grinding for a period of time lower by about an order of magnitude than the time necessary to achieve this grain size by a similar grinding step carried out at ambient temperature.

13 Claims, 7 Drawing Sheets

5,837,030

PREPARATION OF NANOCRYSTALLINE ALLOYS BY MECHANICAL ALLOYING CARRIED OUT AT ELEVATED TEMPERATURES

BACKGROUND OF THE INVENTION a) Field of the Invention

The present invention relates to an improved process for preparing a nanocrystalline powder of an alloy made of at least two metals.

More particularly, it relates to an improved process wherein the nanocrystalline powder is obtained by subjecting a mixture of metal powders to an intensive mechanical grinding carried out in a high energy, ball milling machine or any similar piece of equipment.

The term "nanocrystalline" as used herein designates any kind of powder consisting of crystallites having a grain size lower than 100 nm.

b) Brief Description of the Prior Art

The preparation of alloys by intensive metal grinding (or milling) of a mixture of metal powders is a well known technique.

Recently, this technique which is also called "mechanical alloying", has been found particularly efficient for the preparation of hydrogen absorbing alloys like FeTi, LaNi$_5$ and Mg$_2$Ni, which are in the form of crystallites and can form hydrides reversibly and thus be used for storing hydrogen.

It has also been found that hydrogen absorbing alloys of very high efficiency are obtained if the mechanical grinding is carried out in such a manner as to reduce the size of the crystallites that are formed to a few nanometers. Indeed, with such nanocrystalline alloys, it becomes possible to store hydrogen very rapidly and without requiring long activation treatment as is necessary when use is made of the same alloys in a conventional polycrystalline form.

In EP-A-671,357 (corresponding to U.S. patent application Ser. No. 08/387,457 filed on Feb. 13, 1995), there is disclosed a process for the preparation of a nanocrystalline powder of an alloy of the formula Mg$_{2-x}$, Ni$_{1+x}$ wherein x ranges between −0.3 and +0.3, which consists in grinding at ambient temperature and atmospheric pressure under an inert atmosphere, a Mg powder with a Ni powder in such amounts as to obtain the requested alloy. In order to obtain the requested crystallites of the formula Mg$_{2-x}$ N$_{1+x}$ and to reduce their grain size to less than 100 nm, it is compulsory to grind the metal powders for at least 50 hours (in the diffraction spectra shown in FIG. 3 of this U.S. patent application Ser. No. 08/387,457 one can see that the requested alloy starts being formed after 26 hours and its full synthesis and the reduction of its crystalline size to less than 30 nm are completed after 66 hours).

In international laid-open patent application No. WO 96/23906 (corresponding to U.S. patent application Ser. No. 08/382,776 filed on Feb. 2, 1996), there is disclosed a process for the preparation of a material of the formula:

$$(M_{1-x}A_x)D_y$$

wherein:

M is Mg, Be or a combination thereof;

A is at least one element selected from the group consisting of Li, Ca, Ti, V, Cr, Mn, Fe, Co, Ni, Cu, Zn, Al, Y, Zr, Nb, Mo, In, Sn, IO, Si, B, C and F (preferably Zr, Ti and Ni);

D is a hydrogen dissociation catalyst selected from the group consisting of Fe, Co, Ni, Ru, Rh, Pd, Ir and Pt (preferably Pd);

x is a number (atomic fraction) ranging from 0 to 0.3; and y is a number (atomic fraction) ranging from 0 to 0.15 (preferably from 0 to 0.02).

This material is of a very light-weight and is capable of reversibly storing hydrogen with very good kinetics. It consists of a powder of particles of the formula M$_{1-x}$A$_x$ having an average size ranging from 0.1 to 100 μm. Each particle may consist of nanocrystalline grains having an average size of 3 to 100 nm. Alternatively, each particle may have a nano-layered structure with a layer spacing of 3 to 100 nm. Some of the particles have clusters of at least one of the metals D attached thereof, each cluster having an average size ranging from 2 to 200 nm.

The process used for preparing this material basically consists in intensely grinding a powder of the metal M until the grain size of the crystallites reaches the requested value, or intensely grinding a mixture of a powder of metal M with a powder of the other metal A in a steel or tungsten carbide crucible of a high energy ball mill. Once again, such grinding is carried out at ambient temperature under an inert atmosphere at atmospheric pressure. It must also be carried out for an extensive period of time so as to obtain the requested particles of formula M$_{1-x}$A$_x$ and to reduce their grain size to the requested value. Once this grinding step is completed, a given amount of the hydrogen dissociation catalyst D can be added to the particles and the resulting mixture is subjected to an additional grinding step to apply clusters of the catalyst D onto the particles M$_{1-x}$A$_x$.

In the article of L. ZALUSKI et al entitled "Effects of relaxation on hydrogen absorption in Fe—Ti produced by ball-milling", Journal of Alloys and Compounds, 227 (1995) 53–57, there is disclosed a process for the preparation of a nanocrystalline powder of a FeTi alloy, which consists of grinding at ambient temperature under an inert atmosphere a mixture of elemental Fe and Ti powders in a high-energy ball milling machine.

This article also discloses that a large amount of energy can be stored in the nanocrystalline FeTi fabricated by high energy ball-milling, as a result of mechanical deformation. Such leads to a high concentration of structural defects (high level of internal strain) and to chemical disorders.

This article further discloses that after having been prepared, the alloy can be subjected to a relaxation treatment consists of annealing the alloy at a temperature of 400° C. in order to reduce its internal strain to at least 40% of the initial value. Surprisingly, such annealing does not change the size of the crystallines. Moreover, annealing gives rise to the appearance of a well-defined plateau in the pressure-composition isotherm of hydrogen adsorption of the alloy at room temperature.

In all cases, the preparation of nanocrystalline alloys by mechanical alloying calls for the mechanical grinding to be carried out for a substantial amount of time, which is generally higher than 50 hours and can be as high as 120 hours.

SUMMARY OF THE INVENTION

It has now been discovered that even when the intensive mechanical grinding is carried out at an elevated temperature, one may still obtain a nanocrystalline alloy.

It has also been discovered that, in such a case, the amount of time required to prepare nanocrystalline alloys by intensive mechanical grinding can substantially be reduced. As a matter of fact, when the grinding is carried out at an elevated temperature ranging from about 100° C. to about 400° C. instead of being carried out at ambient temperature, one may prepare a nanocrystalline alloy powder within a few hours instead of a few ten hours.

Of course, such a reduction in time results in a reduction in the preparation cost, as the amount of energy required for simultaneously grinding and heating the powders for a short period of time is usually smaller than the amount of energy required for operating the ball-milling machine at ambient temperature for a very long period of time.

It has further been discovered that when the grinding step is carried out at an elevated temperature, some structural defects (holes, dislocations, internal strain) are "automatically" avoided, thereby making it possible to obtain nanocrystalline powders of hydrogen adsorbing alloys like $Mg_2Ni$ or FeTi, without having to subject the same to a subsequent annealing.

As a matter of fact, it has been found that when the grinding step is carried out at 100° to 400° C., interdiffusion of the elements of the powder mixture processed within the crucible of the ball milling machine is improved, thereby resulting in a substantial reduction of time in the preparation process, and in the obtention of alloys having less-intrinsic defects.

The preparation of a nanocrystalline alloy by intensive mechanical grinding of a mixture of metal powders at elevated temperature should not be confused with the conventional induction melting processes used for preparing alloys, or with the conventional sintering process well known in the metallurgical art. Thus, by way of example, Li J. et al in Advanced Materials, vol. 5, No. 7/8, July 1993, pp. 554–555, disclose an induction melting process consisting in heating constituent metals to 850° C.–900° C. under an inert atmosphere, cooling them to the room temperature and pulverizing them into particles of 25 to 100 mesh. This process and the range of operating temperatures are completely different from those mentioned hereinabove and the resulting alloy is not of nanocrystalline structure.

In the same article of Li et al, there is also disclosed a process for the production of a $Mg_2Ni$ alloy using a powder metallurgy technique, which comprising mixing Mg and Ni powder in appropriate proportions, shaping the mixed powders in an isobaric press, subjecting the shaped mixture to sintering at 300° to 600° C. for 1 to 10 hours in a tube furnace; and letting it cool to room temperature under argon. In this sintering process, there is no mechanical grinding and the particles of alloy that are obtained are not of nanocrystalline structure.

Thus, the present invention as claimed hereinafter is directed to an improved process for preparing a nanocrystalline powder of an alloy made of at least two metals, which process is the type comprising the step of subjecting to an intestive mechanical grinding a mixture of powders of these metals in such amounts as to obtain the requested alloy. As usual, such intensive metal grinding must be carried out under atmospheric pressure in an inert atmosphere and for a period of time sufficient to achieve formation of the crystallites and reduction of the grain size of the crystallites to the requested value.

In accordance with the invention, this process is improved in that the intensive mechanical grinding is carried out at an elevated temperature ranging from about 100° C. to about 400° C. and preferably from 150° C. to 300° C., whereby a substantial reduction of the above mentioned period of time is achieved.

The invention and its advantages will be better understood upon reading the following non-restrictive detailed description thereof, made with reference to the accompanying drawings.

DETAILED DESCRIPTION OF THE INVENTION

Figure 1:
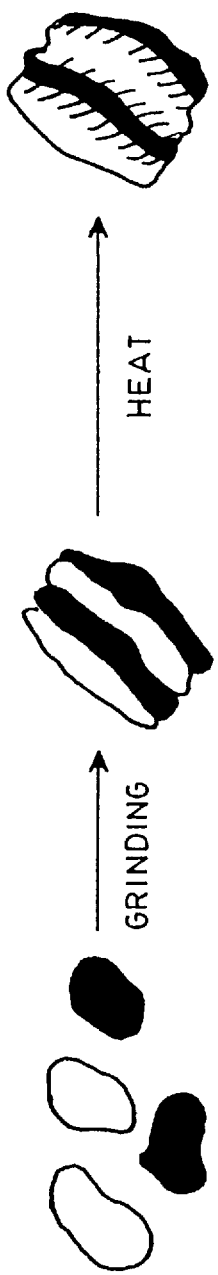
FIG. 1 is a schematic representation of the alloying process that takes place when a mixture of metal powders is subjected to intensive mechanical grinding at elevated temperature.

As aforesaid, the process according to the invention is intended to be used for preparing a nanocrystalline powder of an alloy made of at least two metals. By "nanocrystalline" powder, there is meant a powder consisting of crystallites having a grain size lower than 100 nm.

The process is of the "mechanical alloying" type and comprises the step of subjecting to an intensive mechanical grinding powders of different metals in such amounts as to obtain the requested alloy.

As is conventional, the intensive metal grinding is carried out at atmospheric pressure under an inert atmosphere for a period of time sufficient to achieve formation of the crystallites and reduction of the grain size of these crystallites to the requested value.

In accordance with the invention, the intensive mechanical grinding be carried out at an elevated temperature ranging from about 100° C. to about 400° C., instead of being carried out at ambient temperature. Such results in a substantial reduction of time in the preparation of the nanocrystalline alloy and in the obtention of alloys having much less intrinsic defects.

As can be understood, the higher is the temperature, the more expensive will be the process because of the heat energy cost. Thus, it is preferable that the process be carried out at a moderate temperature ranging from about 150° C. to about 300° C.

The intensive mechanical grinding can be carried out in a high-energy ball milling machine like those sold under the trademarks SPEX 8000, FRITCH and ZOZ.

If desired, up to 10% by weight of a lubricant can be added to the mixture of powders to be ground. Such lubricant may for example, consisting of carbon, boric nitride or $Al_2O_3$.

This improved process is particularly well adapted for the preparation of hydrogen absorbing Ni or Mg based alloys.

The Ni-based alloys may be:

$a_1$) bimetallic alloys made of Ni and one other metal selected from the group consisting of Be, Li, Mg and La; or $a_2$) intermetallic alloys made of Ni, at least one other metal selected from the group consisting of Be, Li, Mg and La, and at least one further metal selected from the group of Al, Co, Cu, Fe, Pd, Zn, Ti, V, Cr, Mn, Zr, Nb and Ca.

The process according to the invention can also be used for preparing nanocrystalline alloys of Fe and Ti with possible addition of Mn, or bimetallic alloys of the formula:

$$(M_{1-x}A_x)$$

wherein:

M is Mg, Be or a combination thereof;

A is at least one element selected from the group consisting of Li, Ca, Ti, V, Cr, Mn, Fe, Co, Ni, Cu, Zn, Al, Y, Zr, Nb, Mo, In, Sn, O, Si, B, C and F; and x is a number ranging from 0 to 0.3

If desired, when the intensive mechanical grinding has been completed and the requested alloy has been obtained in the form of crystallites having a grain size lower than 100 nm, a given amount of a powder of a hydrogen dissociation catalyst can be added to the crystallites and the resulting mixture can be subjected to an additional grinding so as to apply clusters of the hydrogen dissociation catalyst onto the crystallites. Such catalyst can be, for example, Pd, Pt, Ir or Rh.

As was already explained hereinabove, heating of the metal powder mixture while the same is subjected to intensive mechanical grinding has been found not to affect the nanocrystalline structure of the resulting alloys. It has also been found that this process substantially reduces the grinding time that is higher than 25 hours and more commonly ranging from 50 to 120 hours, down to less than 10 hours. It has further been found that this process substantially reduces the strain and internal defects of the alloys, thereby making them more efficient (well-defined plateau and higher storage capacity).

As is shown in FIG. 1, mechanical grinding of powders of different metals (shown in black and white) allows the formation of a layered structure. Simultaneous heating causes an interdiffusion of the metals (shown in dotted lines) and a substantial acceleration in the formation of the resulting alloy.

In order to shown the advantage and efficiency of the process according to the invention, comparative experiments were carried out, using $Mg_2Ni$ as illustrative alloy.

COMPARATIVE EXAMPLE 7 g of Mg and Ni in a mole ratio of 2:1 were subjected to an intensive mechanical grinding in a high energy ball milling machine SPEX® 8000, having a crucible of 60 ml. Use was made of three steel balls (2 of $7/16"$ and 1 of $9/16"$). The grinding was carried out under a nitrogen atmosphere at ambient pressure and ambient temperature for up to 150 hours. The $Mg_2Ni$ crystallites that were so obtained had a grain size ranging from 10 to 15 nm.

Figure 2:
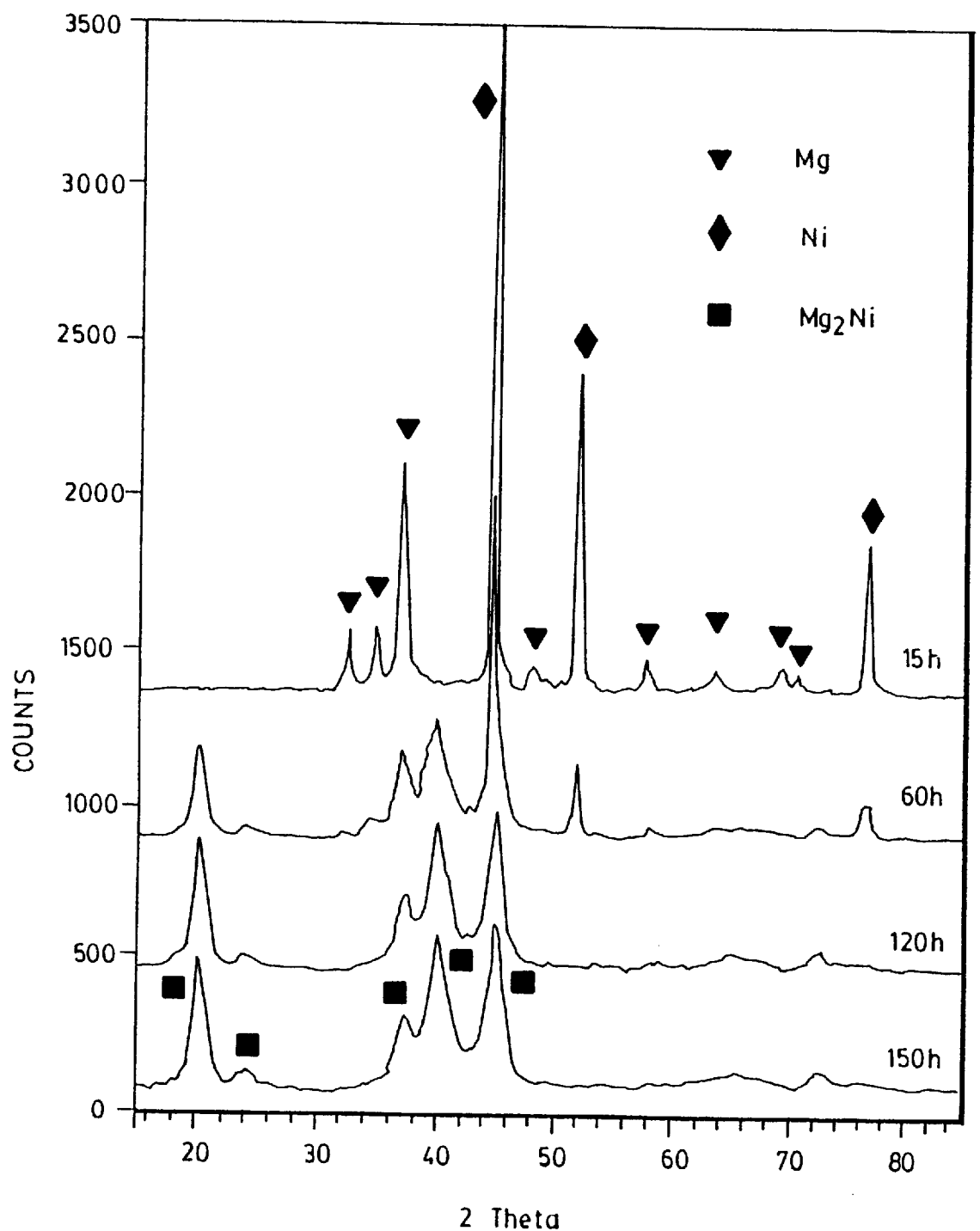
FIG. 2 is a representation of the X-ray diffraction spectra of a mixture of Mg and Ni in a mole ratio of 2:1, while the same was subjected to intensive mechanical grinding at room temperature, the spectra having been taken at intervals of 15, 60, 120 and 150 hours.

As is shown from the X-ray diffraction spectra given as in FIG. 2, $Mg_2Ni$ was formed after 60 hours. After 120 hours, the alloy formation was completed.

Figure 3:
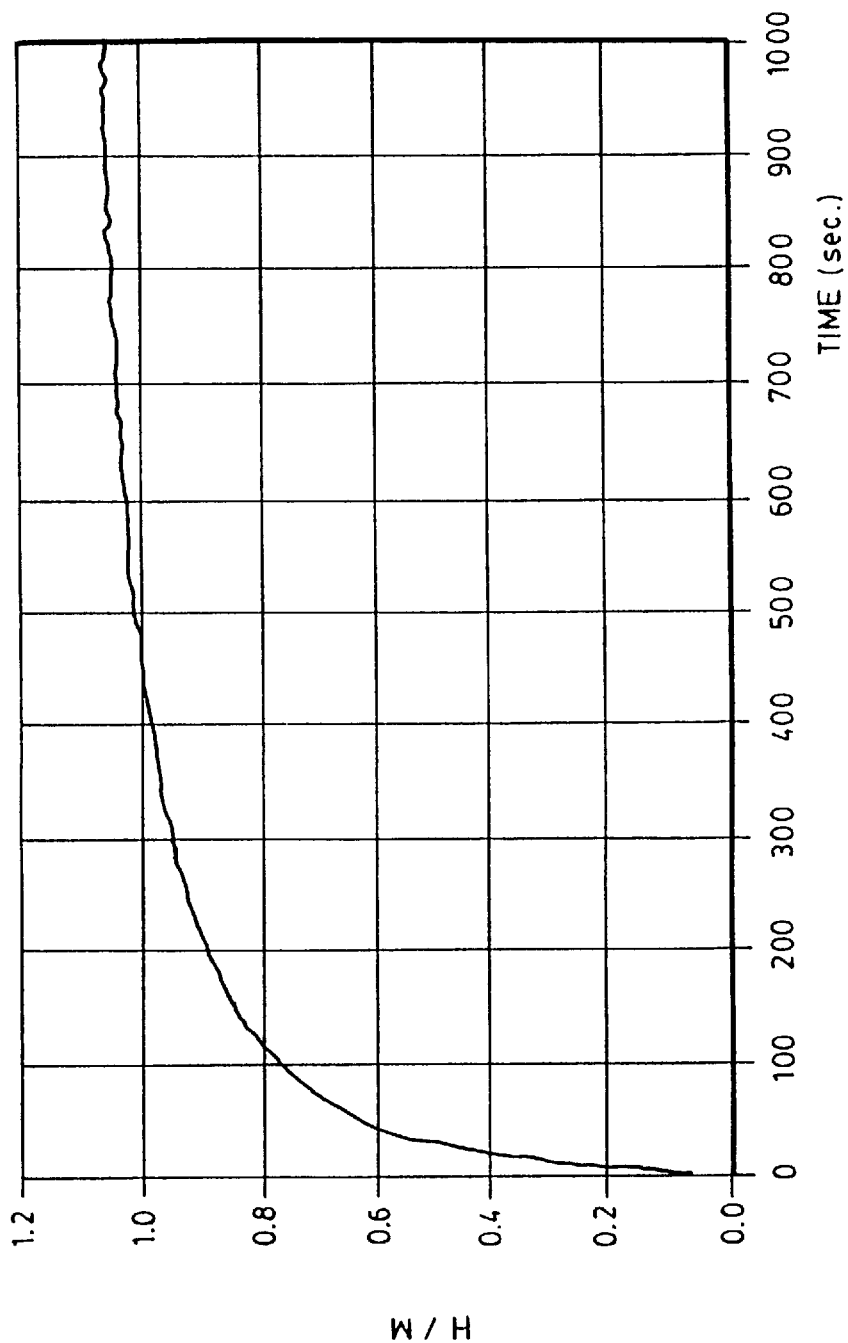
FIG. 3 is a curve showing the hydrogen absorbtion rate at 12 bars and 300° C. of a nanocrystalline $Mg_2Ni$ alloy prepared by intensive mechanical grinding for 150 hours at room temperature, after one absorption.

FIG. 3 shows the hydrogen absorption rate of the $Mg_2Ni$ alloy that was so prepared, at 12 bars (about 170 PSI) and 300° C.

EXAMPLE 1

Like in the comparative example disclosed hereinabove, 7 g of Mg and Ni in a mole ratio of 2:1 were subjected to an intensive mechanical grinding in a same high energy ball milling machine SPEX® 8000, using the same kind of crucible and steel balls. The only difference was that the rubber O-ring of the machine was replaced by a copper O-ring and the crucible was heated during the grinding step by means of an electric heating element wound around the crucible.

In this particular example, the grinding was carried out for 5 hours while the heating element was operated. After 5 minutes, the temperature was 150° C. After 10 minutes, it was 240° C. After 30 minutes, the temperature was 270° C. and it remained in the range of 290° C. for the balance of the process.

Figure 4:
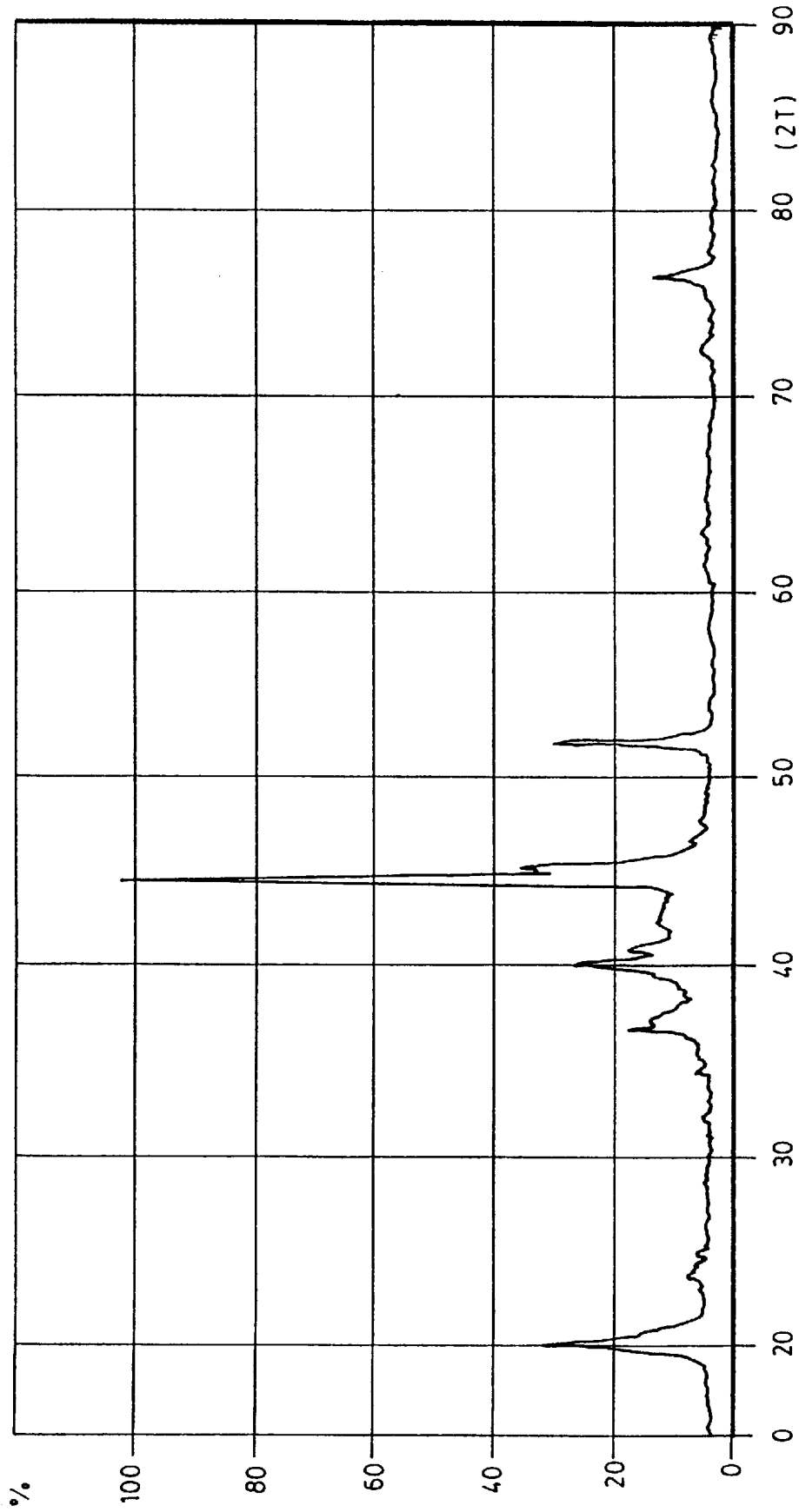
FIG. 4 is a representation of the X-ray diffraction spectrum of a mixture of Mg and Ni in a mode ratio of 2:1, taken after 5 hours of intensive mechanical grinding at about 290° C.

The X-ray diffraction spectrum of the mixture contained in the crucible after 5 hours of grinding at such elevated temperature is shown in FIG. 4. As can be seen, this spectrum is almost identical to the one that was obtained after 60 hours of grinding at ambient temperature (see FIG. 2).

The $Mg_2Ni$ crystallites that were so obtained had a grain size of 70 to 80 nm. There were bigger than those obtained at ambient temperature, but they were still nanocrystalline in structure, i.e. lower than 100 nm.

Thus, this example shows that when the grinding step is carried out at an elevated temperature, a nanocrystalline alloy can be obtained at a speed almost 10 times faster than when the same grinding is carried out at ambient temperature. Moreover, no subsequent annealing is required, since the annealing effect is already achieved during the grinding process.

EXAMPLE 2

Another sample of nanocrystalline $Mg_2Ni$ alloy was prepared, using the same amounts of metals, the same operative conditions and the same equipments as in example 1.

The only differences with example 1 were that:

the powder mixture used as starting material contained 5% by weight of carbon as a lubricant; and the average grinding temperature was 200° C. (instead of 290° C.).

The following table gives the crystallite size, the stain and phase abundance after 3 to 8 hours of intensive grinding (milling).

TABLE 1

| Characteristic | Phase | Milled 3 hours | Milled 8 hours |
|---|---|---|---|
| Phase abundance (weight %) | $Mg_2Ni$ | 37% | 97% |
|  | Ni | 36% | 3% |
|  | Mg | 27% | — |
| Crystallite size (nm) | $Mg_2Ni$ | 126 | 50 |
|  | Ni | 58 | 27 |
|  | Mg | 171 | — |
| Strain (%) | $Mg_2Ni$ | 0.8 |  |
|  | Ni | 1.0 |  |
|  | Mg | 1.0 |  |

Figure 5:
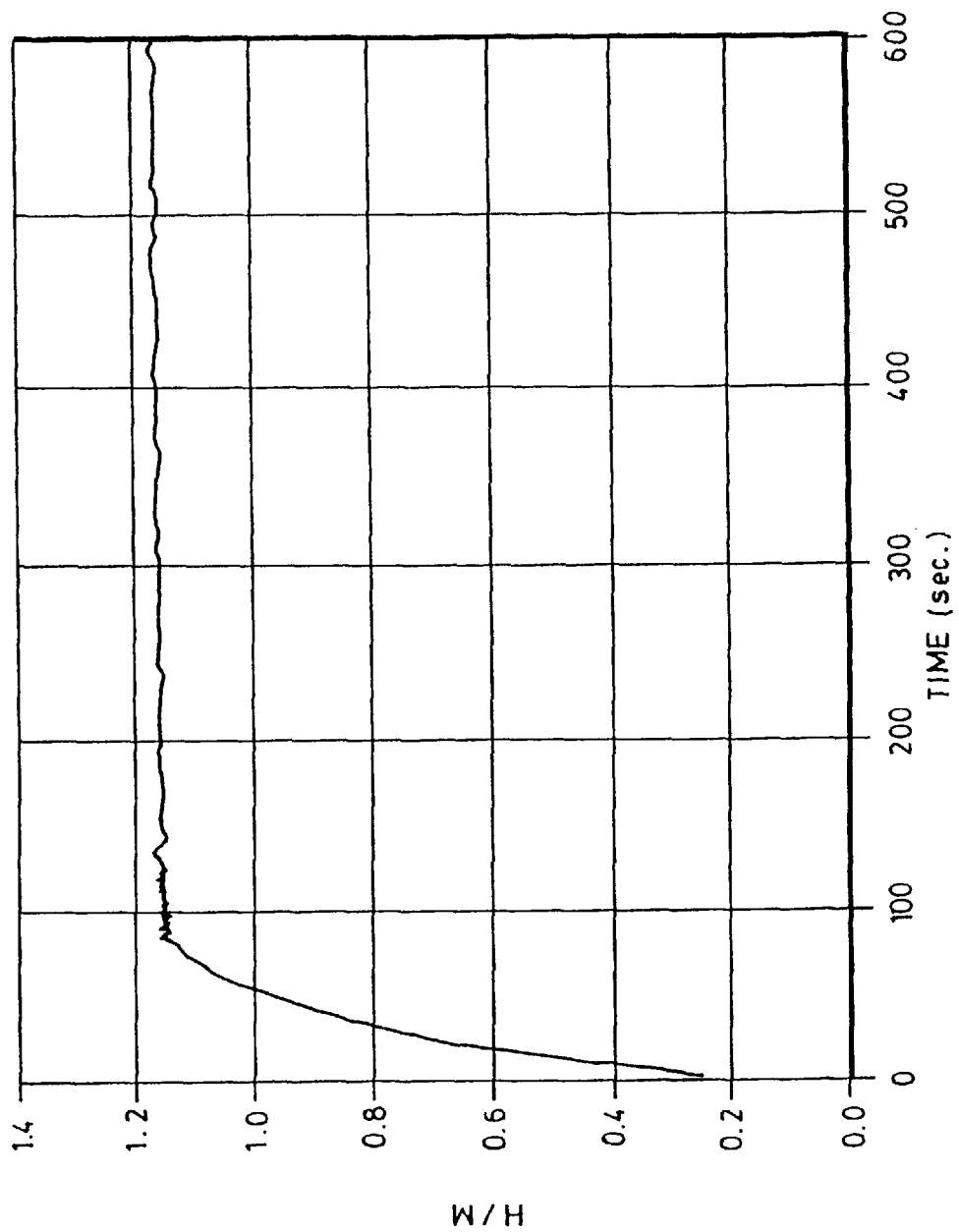
FIG. 5 is a curve similar to the one of FIG. 3 showing the hydrogen absorption rate at 12 bars and 300° C. of a nanocrystalline $Mg_2Ni$ alloy prepared by intensive mechanical grinding for 8 hours at about 200° C., after three absorptions.
Figure 6:
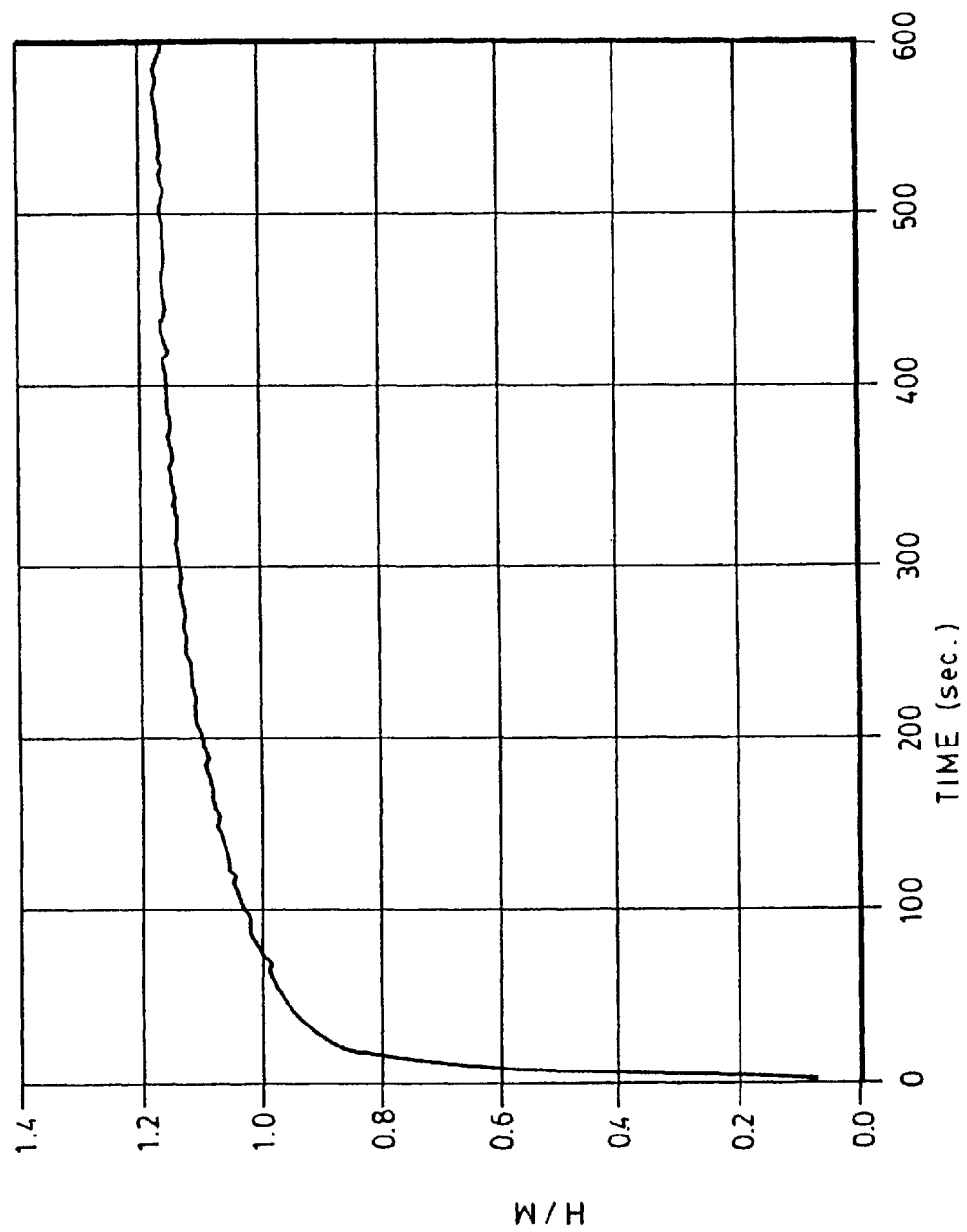
FIG. 6 is a curve similar to the one of FIG. 5, showing the hydrogen absorption rate at 12 bars and 200° C. of the same alloy after four absorption.

FIGS. 5 and 6 show the hydrogen absorption rates of the $Mg_2Ni$ alloy that was obtained after 8 hours of milling at 200° C., after 3 and 4 absorptions, respectively. Such rates were measured at a pressure of 12 bars and a temperature of 300° C. for FIG. 5, and 200° C. for FIG. 6. Thus, the rate reported in FIG. 5 was obtained under the same conditions as used in the comparative example (see FIG. 3).

As can be seen, the absorption rate of the alloy prepared by milling in accordance with the invention, viz. at elevated temperature, is substantially faster than the absorption rate of the alloy prepared by milling at ambient temperature.

Figure 7:
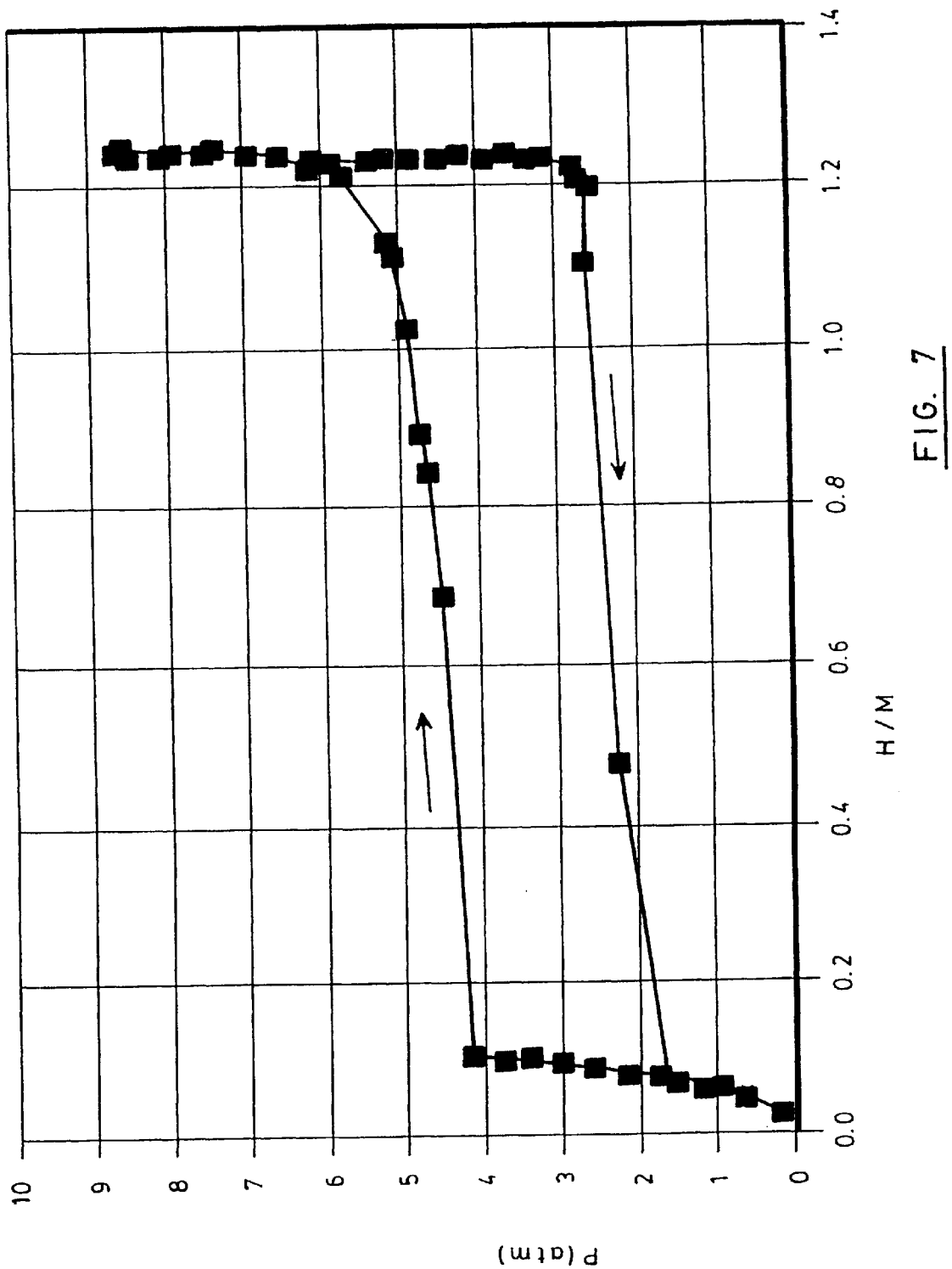
FIG. 7 is a curve showing the pressure-composition isotherm at 300° C. of the alloy used for the tests reported in FIGS. 5 and 6.

FIG. 7 is a curve showing the pressure-composition isotherm obtained with the above alloy milled for 8 hours at 200° C. As can be seen, this curve clearly shows the formation of a plateau both for absorption and desorption, like those that are obtained by subsequent annealing of a nanocrystalline alloy obtained by intensive mechanical grinding at ambient temperature (see, by way of comparison, FIG. 2 of the above mentioned article of L. ZALUSKI et al, Journal of Alloys and Compounds, 222 (1995) 53–57. Thus, the process according to the invention permits not only to prepare the hydrogen absorbing nanocrystalline alloy but simultaneously also to activate the same.

Of course, numerous modifications could be made as to the way of reducing to practice this invention depending on the kind of alloy to be prepared and the characteristics such alloy should have. Such modifications are obvious for one skilled in the art and would not depart from the scope of the appended claims.

We claim:

1. In a process for preparing a nanocrystalline powder of an alloy made of at least two metals, said nanocrystalline powder consisting of crystallites having a grain size lower than 100 nm, said process comprising the step of subjecting to an intensive mechanical grinding a powder of one of said at least two metals with a powder of every other one of said at least two metals in such amounts as to obtain said alloy, said intensive mechanical grinding being carried out at atmospheric pressure under an inert atmosphere and for a period of time sufficient to achieve formation of said crystallites and reduction of the grain size of said crystallites to lower than 100 nm;

the improvement comprising carrying out said intensive mechanical grinding at an elevated temperature ranging from about 100° C. to about 400° C., whereby said crystallites of said grain size are obtained in a period of time lower by about an order of magnitude than that necessary to obtain said crystallites of said grain size by a substantially identical mechanical grinding step carried out at ambient temperature.

2. The improved process of claim 1, wherein said elevated temperature ranges from about 150° C. to about 300° C.

3. The improved process of claim 2, wherein the alloy is hydrogen absorbing alloy selected from the group consisting of:

a$_1$) binary alloys made of Ni and one other metal selected from the group consisting of Be, Li, Mg and La;

a$_2$) intermetallic alloys made of Ni, at least one other metal selected from the group consisting of Be, Li, Mg and La, and at least one further metal selected from the group of Al, Co, Cu, Fe, Pd, Zn, Ti, V, Cr, Mn, Zr, Nb and Ca;

b$_1$) alloys of the formula:

wherein:

M is Mg, Be or a combination thereof;

A is at least one element selected from the group consisting of Li, Ca, Ti, V, Cr, Mn, Fe, Co, Ni, Cu, Zn, Al, Y, Zr, Nb, Mo, In, Sn, O, Si, B, C and F;

x is a number ranging from 0 to 0.3;

c$_1$) binary alloys made of Fe and Ti; and d$_1$) ternary alloys of Fe, Ti and Mn.

4. The improved process of claim 3, wherein said alloy is $Mg_2Ni$.

5. The improved process of claim 3, further comprising adding, when the intensive mechanical grinding is completed and said alloy is obtained in the form of crystallites having a grain size lower than 100 nm, an amount of a powder of a hydrogen dissociation catalyst material to said crystallites to form a mixture; and subjecting said mixture to an additional grinding so as to apply clusters of said catalyst material onto said crystallites.

6. The improved process of claim 5, wherein said catalyst material is selected from the group consisting of Pd, Pt, Ir and Rh.

7. The improved process of claim 5, wherein said intensive mechanical grinding is carried out in a high-energy ball milling machine in the presence of lubricant.

8. The improved process of claim 7, wherein the lubricant is graphite.

9. The improved process of claim 1, wherein said intensive mechanical grinding is carried out in a high-energy ball milling machine in the presence of lubricant.

10. The improved process of claim 9, wherein the lubricant is selected from the group consisting of graphite, boron nitride and $Al_2O_3$.

11. The improved process of claim 1, wherein the alloy is selected from the group consisting of:

a) alloys made of Ni and of at least one other metal;

b) alloys made of Mg and at least one other metal;

c) alloys made of Fe and Ti;

d) alloys made of Fe, Ti and Mn.

12. The improved process of claim 1, wherein the period of time is $\leq 8$ hours.

13. The improved process of claim 1, wherein the period of time is $\leq 5$ hours.

* * * * *